United States Patent [19] [11] 4,412,702
Bach et al. [45] Nov. 1, 1983

[54] FLUID PRESSURE PROPORTIONING VALVE AND PLUG MEMBER THEREFOR

[75] Inventors: Lloyd G. Bach, South Bend, Ind.; Robert F. Gaiser, Stevensville, Mich.

[73] Assignee: The Bendix Corporation, Southfield, Mich.

[21] Appl. No.: 265,945

[22] Filed: May 21, 1981

[51] Int. Cl.³ .............................. B60T 8/26; B60T 11/34
[52] U.S. Cl. .................................... 303/6 C; 188/349; 303/84 A
[58] Field of Search ............... 303/6 C, 6 R, 84 A, 303/84 R, 22 R, 22 A; 188/349, 151 A, 345, 195; 60/591

[56] References Cited

U.S. PATENT DOCUMENTS

| | | | |
|---|---|---|---|
| 3,736,031 | 5/1973 | Yabuta et al. | 303/6 C |
| 3,836,204 | 9/1974 | Van Wicklin, Jr. | 303/6 C |
| 3,892,445 | 7/1975 | Oberthur | 303/22 R |
| 3,964,795 | 6/1976 | Mathues | 303/6 C |
| 3,975,059 | 8/1976 | Orzel | 303/6 C |
| 3,977,731 | 8/1976 | Kasahara | 303/6 C |
| 4,201,054 | 5/1980 | Bainbridge | 60/591 X |
| 4,213,655 | 7/1980 | Brademeyer | 303/6 C |
| 4,281,880 | 8/1981 | Gaiser et al. | 303/6 C |
| 4,284,308 | 8/1981 | Hayashida | 303/6 C |
| 4,335,922 | 6/1982 | Berisch et al. | 303/6 C |

Primary Examiner—Douglas C. Butler
Attorney, Agent, or Firm—Paul David Schoenle; Ken C. Decker

[57] ABSTRACT

A fluid pressure proportioning valve (48), particularly of the type which is used in the hydraulic braking systems of automotive vehicles, includes a plug member (28) movably carrying a piston member (50). The piston member (50) defines a through bore (88) communicating pressurized fluid to an outlet on the plug member (28). The piston member also carries a valve member (116) opening and closing the through bore (88) in response to reciprocation of the piston member (50). A lip seal (62), spring seat (100), and a coil spring (110) are carried by the piston member (50). The plug member (28), piston member (50), valve member (116), lip seal (62), spring seat 100, and coil spring 110, comprise a unitary subassembly (142) which may be assembled with a housing providing a bore for receiving the coil spring (110) and lip seal (62) and providing an inlet communicating pressurized fluid from a master cylinder (10). The unitary subassembly (142) incorporates virtually all component parts, the dimension of which affect the proper operation of the fluid pressure proportioning valve. As a result, the dimensional tolerances of the housing may be relaxed without adverse effect upon the proportioning valve (48).

3 Claims, 6 Drawing Figures

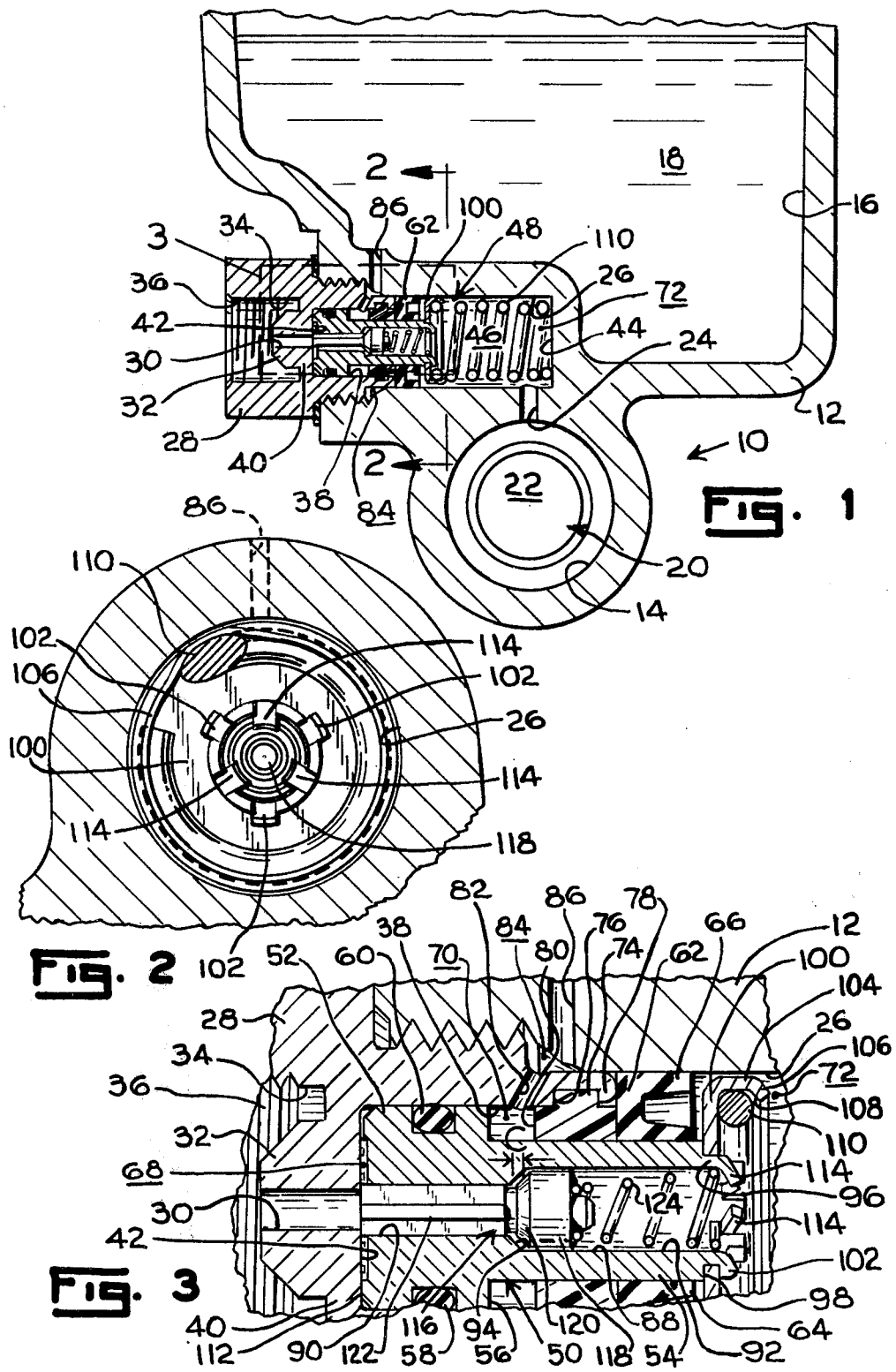

FLUID PRESSURE PROPORTIONING VALVE AND PLUG MEMBER THEREFOR

This invention relates to a fluid pressure proportioning valve. More specifically, this invention relates to a pressure proportioning valve of the type which is used in automotive vehicles to control the hydraulic pressure from a master cylinder to the brakes at a rear axle in order to prevent rear wheel lock-up and vehicle skidding.

Accordingly this invention provides a fluid pressure proportioning valve comprising a housing defining a bore therein, first passage means for communicating pressurized fluid from a source thereof into said bore, second passage means for communicating pressurized fluid from said bore to a fluid pressure responsive device, a differential-area piston member movably received in said bore and dividing the latter into a pair of chambers, one of said chambers communicating with said first passage means, the other of said chambers communicating with said second passage means, third passage means for interconnecting said pair of chambers, valve means for opening and closing said third passage means to respectively establish and interrupt fluid communication between said fluid source and said device in response to movement of said piston member, resilient means for biasing said piston member toward a first position wherein said valve means opens said third passage means, said piston member moving axially to a second position in response to a prescribed fluid pressure level in said pair of chambers to close said third passage means via said valve means, said piston member shuttling axially between said first and second positions in response to fluid pressure in said one chamber increasing above said prescribed pressure level to proportion pressurized fluid to said device via said other chamber.

A fluid pressure proportioning valve is known in accordance with the U.S. Pat. No. 3,977,731, issued Aug. 31, 1976, to H. Kasahara, wherein a casing defines a stepped bore which is closed at one end by a threaded plug threadably engaging the casing. The casing defines an inlet communicating with the small diameter portion of the stepped bore and an outlet communicating with the large diameter portion of the stepped bore adjacent the threaded plug. A stepped piston is movably received in the stepped bore between the inlet and outlet. The piston defines an axially extending passage providing fluid communication between the inlet and outlet. The piston also carries a caged spring on the small diameter portion thereof. The caged spring urges the piston toward the threaded plug to a first position relative to the casing. A valve box is received in the axially extending passage of the piston. The valve box defines a valve seat and houses a ball which is urged toward the valve seat by a coil spring. The threaded plug carres a rod which extends into the axially extending passage of the piston to unseat the ball when the piston is in its first position.

When pressurized fluid is supplied to the inlet of the Kasahara invention, the pressurized fluid is communicated to the outlet via the axially extending passage and acts on both the small diameter and large diameter portions of the piston. As a result, the pressurized fluid creates an axially directed force on the piston which moves the piston from its first position and away from the threaded plug. In response to a determined pressure at the inlet, the piston moves a determined distance away from the threaded plug so that the ball engages the valve seat to interrupt communication between the inlet and outlet to define a second position for the piston. Thereafter, increasing fluid pressure at the inlet acts on the small diameter portion of the piston to move the piston toward the first position and to unseat the ball. Consequently, as fluid pressure at the inlet increases above the determined pressure, the piston dithers near its second position to proportion fluid pressure to the outlet as a function of inlet pressure according to the areas of the two piston portions. Moreover, a graph of outlet pressure versus inlet pressure will show outlet pressure matching inlet pressure until the determined inlet pressure is reached whereupon a cusp occurs and outlet pressure increases become a porportion of inlet pressure increases. The determined inlet pressure at which the cusp occurs is a function of: the difference in effective areas of the two piston portions; of the spring rate and preload of the caged spring; and of the axial distance between the first and second piston positions as determined by the dimensions of the casing, piston, spring cage, valve box, threaded plug, and rod. Of course, friction caused by the seals on the piston also influence the location of the cusp on the graph of outlet pressure versus inlet pressure.

Another fluid pressure proportioning valve is known in accordance with the U.S. Pat. No. 3,892,445, issued July 1, 1975, to H. Oberthur, wherein a casing defines a stepped bore receiving a stepped piston. An inlet and an outlet provide fluid communication through the bore via a passage within the piston. A valve member is received in the passage to open and close fluid communication therethrough in response to movement of the piston. The casing defines an abutment surface which is engaged by the piston to define a first position for the piston. The valve member includes an operating stem which engages the abutment surface of the casing to hold the valve member open when the piston is in its first position. The proportioning valve of Oberthur operates similarly to the valve of Kasahara. However, the location of the cusp on the curve of outlet pressure versus inlet pressure is determined only by the differential area of the piston, the spring rate and preload of the resilient member, and by the dimensions of the piston and operating stem. In other words, the dimensions of the casing and of the plug member, if any, are not critical to a determination of the cusp location except to the extent that they influence the preload of the resilient member.

In light of the above, it will be appreciated that fluid pressure proportioning valves generally require precise manufacturing of their component parts if the valves are to operate as desired. In the case of the Kasahara invention, at least six dimensions of the piston, casing, threaded plug, valve box, rod, and spring cage must be precisely controlled if the cusp on the curve of outlet pressure versus inlet pressure is to occur at a prescribed pressure. Further, errors in the critical dimensions of the enumerated component parts are cumulative so that manufacturing tolerance stackups exacerbate the difficulty outlined above.

Further, where the casing for the fluid pressure proportioning valve is an integral part of a housing for a larger apparatus, as it is in the Kasahara invention, a relatively minor manufacturing error in the proportioning valve portion of the apparatus housing may require the entire housing to be scrapped.

Therefore, it is an object for this invention to provide a fluid pressure proportioning valve wherein manufacturing tolerance stackups which affect the cusp location are substantially avoided.

Another object for this invention is to provide a fluid pressure proportioning valve wherein the dimensions of the casing portion of the valve are less critical to proper valve operation than is the case with prior valves.

Still another object of this invention is to provide a fluid pressure proportioning valve wherein friction opposing movement of the piston member is minimized.

Accordingly, the invention provides a fluid pressure proportioning valve characterized in that said housing includes a plug member defining a portion of said bore receiving a portion of said piston member, said plug member further defining an abutment surface confronting said piston member, said piston member engaging said abutment surface to define a rest position for said piston member, said piston member further including an axially extending bore receiving said valve means and defining said third passage means, said valve means including an operating stem extending axially in said axially extending bore and engageable with said abutment surface to open said valve means when said piston member is in said rest position.

The advantages offered by the invention are mainly that the dimensions of the remainder of the bore which is defined in the housing are not critical to the proper operation of the proportioning valve except to the extent that those dimensions affect the preload of the resilient means; variations in the dimensions of the housing which do affect the preload of the resilient means have a relatively minor effect upon the location of the cusp. For example, if the valve member and valve seat of the valve means must define a clearance of 0.75 mm (0.030 inch) in the rest position of the piston member in order to provide sufficient fluid communication from the inlet to the outlet, a manufacturing error of 0.25 mm (0.010 inch) in the housing of the Kasahara invention which causes a 0.25 mm (0.010 inch) variation of the valve clearance introduces an error factor of 0.25/0.75 mm (0.010/0.030 inch) or ⅓ into the physical parameters effecting cusp location. On the other hand, a similar manufacturing error in a valve according to the invention affects only the preload of the resilient means. For example, if the resilient means has a free length of 38.1 mm (1.5 inch) and an installed length of 25.4 mm (1.0 inch), the preload of the resilient means equals its spring rate times the deflection of 12.7 mm (0.5 inch). An error of 0.25 mm (0.010 inch) in the housing affects the preload, and the cusp location, by an error factor of only 0.25/12.7 mm (0.010/0.500 inch) or 1/50. The axial distance between the rest and second positions of the piston member, which is critical to proper location of the cusp, is determined by the dimensions of the piston member and operating stem; manufacturing tolerance stackups which affect the cusp location are substantially avoided; the dimensions of the housing portion of valve are less critical then with prior valves; and friction opposing movement of the piston member is minimized so that the cusp will occur at substantially the same inlet pressure during successive operations of the valve. Further, because the plug member defines a bore receiving a portion of the piston member, the plug member, piston member, valve means, and resilient means may be integrated into a unitary subassembly. The unitary subassembly may be combined with a housing, for example, the housing of a master cylinder, to provide a proportioning valve which is "plugged in" to the master cylinder. Consequently, if the plug in proportioning valve malfunctions, the defective unit may be removed and a new unit plugged in to the master cylinder without disassembly as replacement of the entire master cylinder.

Three ways of carrying out the invention are described in detail below with reference to drawing Figures which illustrate only the three preferred embodiments, in which:

FIG. 1 is a fragmentary cross-sectional view of a master cylinder embodying the invention;

FIG. 2 is a fragmentary cross-sectional view taken along the line 2—2 of FIG. 1;

FIG. 3 is an enlarged view of an encircled portion of FIG. 1;

Figure 4:
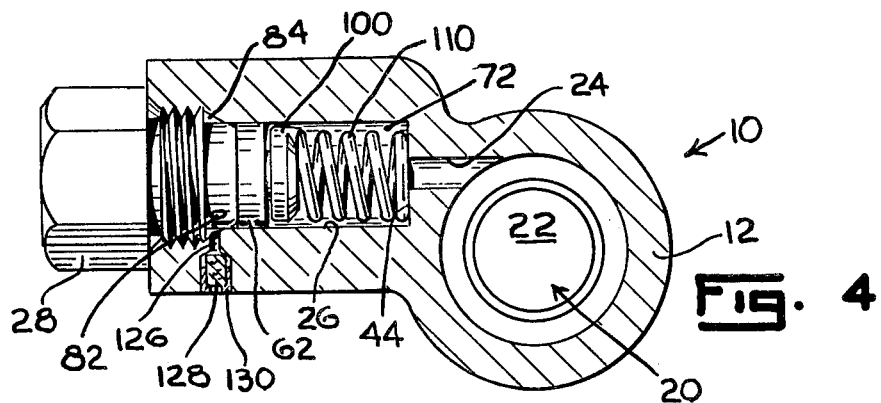
FIG. 4 is a fragmentary cross-sectional view of an alternative embodiment of the invention.

FIGS. 1-3 show a master cylinder 10 having a housing 12 defining a bore 14 and a recess 16. The recess 16 is closed by a cap (not shown) and cooperates with the cap to define a reservoir 18 for holding a liquid at ambient atmospheric pressure. Liquid from the reservoir 18 is admitted to the bore 14 via a compensation port (not shown). A piston assembly 20 is movably received in the bore 14 and cooperates with the housing 12 to define a pressure chamber 22. When the piston assembly 20 is moved by an operator input force, liquid is trapped and pressurized in the pressure chamber 22.

The housing 12 defines an inlet 24 communicating pressurized liquid from the pressure chamber 22 to a bore 26. A plug member 28 threadably engages the housing 12 and closes the bore 26. The plug member 28 defines an outlet 30 communicating with the bore 26. The outlet 30 opens at its left end on a tube seat 32. A bore 34 in the plug member 28 leads to the tube seat 32 and defines a screw thread 36 for threadably receiving a tube nut (not shown). Consequently, a conduit or brake line (not shown) may be connected to the plug member 28 to conduct pressurized liquid from the master cylinder 10 to a brake.

The plug member 28 defines a bore 38 which is substantially concentric with and opens at its right end to the bore 26. The plug member 28 further defines a wall 40 defining a surface 42. The surface 42 of the wall 40 confronts an end wall 44 of the bore 26. Consequently, the bore 26 of the housing 12 and the bore 38 of the plug member 28 communicate and cooperate to define a compartment 46.

A valve apparatus 48 is received in the compartment 46. The valve apparatus 48 cooperates with the housing 12 and with the plug member 28 to control the flow of pressurized fluid from the outlet 30 as a function of the fluid pressure level at the inlet 24.

The valve apparatus 48 includes a piston member 50 which is movably received in the compartment 46. The piston member 50 includes a large diameter portion 52 and a small diameter portion 54. The large and small diameter portions 52 and 54, of the piston 50 cooperate to define a shoulder 56. An annular groove 58 circumscribes the large diameter portion 52. An annular sealing member 60 is received in the groove 58 to movably and sealingly cooperate with the bore 38 of the plug member 28. The small diameter portion 54 of the piston 50 projects from the bore 38 into that portion of the compartment 46 which is defined by the bore 26 of the housing 12. An annular lip seal 62 is carried on the small diameter portion 54 of the piston 50. The lip seal 62 includes a pair of like-disposed, radially spaced lips 64 and 66 which are disposed away from the plug member 28. The radially inner lip 64 sealingly and movably engages the projecting small diameter portion 54 of the piston 50. The radially outer lip 66, sealingly engages the housing 12. The piston member 50, sealing member 60, and lip seal 62, cooperate to divide the compartment 46 into three chambers designated as 68, 70, and 72. An annular bearing member 74 is received in the chamber 70 and is trapped therein between a step 76 on the bore 38 and a radially inwardly extending lip 78 defined by the plug member 28. The bearing member 74 defines an abutment surface 80 which confronts the step 56 of the piston member 50. Consequently, the piston member 50 is engageable with the abutment surface 80 to prevent removal of the piston member from the bore 38 of the plug member.

A radially extending vent hole 82 connects the chamber 70 with an annular chamber 84 defined between the plug member 28 and housing 12. A vent passage 86 defined by the housing 12 connects the annular chamber 84 with the reservoir 18.

In order to provide fluid communication to the outlet 30, the piston member 50 defines an axially extending through bore 88. The bore 88 provides a small diameter portion 90 and a large diameter portion 92. The bore portions 90 and 92 cooperate to define a conically tapered step 94 therebetween. At the right end of the small diameter piston portion 54, the piston member 50 defines a reduced diameter portion 96. The reduced diameter portion 96 cooperates with the small diameter piston portion 54 to define a step 98. An annular cup-shaped washer or spring seat 100 is received on the reduced diameter portion 96 and engages the step 98. The reduced diameter portion 96 is deformed radially outwardly at three locations which are spaced approximately 120 degrees apart, viewing FIGS. 2 and 3, to define projections 102. The projections 102 trap the spring seat 100 on the reduced diameter portion 96. The spring seat 100 includes an axially extending annular rim 104 and a radially inwardly extending lip 106. The rim 104 and lip 106 cooperate with the remainder of the spring seat 100 to define an annular recess 108. The left end of a coil compression spring 110 is snapped into the recess 108 so that the coil spring 110 is secured to and carried by the spring seat 100. The coil spring 110 extends between the spring seat 100 and the end wall 44 of the bore 26 to bias the piston member 50 leftwardly. Consequently, an abutment surface 112 defined by the large diameter portion 52 of the piston member 50 engages the surface 42 defined by the wall 40 of the plug member 28 to define a rest position for the piston member 50. The reduced diameter portion 96 is also deformed radially inwardly at three locations, viewing FIGS. 2 and 3, which are spaced approximately 120 degrees apart to define projections 114.

A valve member 116 is movably received in the bore 88 of the piston member 50. The valve member 116 includes a head portion 118 which defines a conically tapered surface 120 confronting the step 94. Consequently, the surfaces 94 and 120 define cooperable valve surfaces. An axially fluted stem 122 extends from the head 118 and is movably received in the bore portion 90. The left end of the stem 122 engages the surface 42 of the plug member 28 so that the valve surfaces 94 and 120 define an axial clearance C when the piston member 50 is in its rest position. A coil compression spring 124 extends between the head portion 118 and the projections 114 to bias the valve member 116 leftwardly into engagement at its stem with the surface 42. The spring rate and/or preload of the spring 124 is less than that of the spring 110 so that the spring 124 cannot move the piston member 50 rightwardly from its rest position.

When an operator input force is applied to the piston assembly 20, liquid is trapped and pressurized in the chamber 22. Pressurized liquid from the chamber 22 flows through the inlet 24 into chamber 72. From chamber 72, pressurized liquid flows through the large diameter portion 92 of the bore 88 between the valve surfaces 94 and 120, through the small diameter portion 90 of the bore 88, and into the chamber 68. From the chamber 68, pressurized liquid flows through the outlet 30 and to a brake system (not shown). Because the portions 52 and 54 of the piston 50 define different effective areas which are exposed to the pressurized liquid in the chambers 68 and 72, a rightwardly directed force is created on the piston member 50. The rightwardly directed force is a function of the fluid pressures in the chambers 68 and 70 and is equal to the difference in effective areas of the piston portions 52 and 54 multiplied by the pressure difference between chambers 68 and 70. When the liquid pressures in the chambers 68 and 72 reach a sufficient value, the force on piston member 50 will overcome the preload of the spring 110 and move the piston member rightwardly from its rest position. When the piston member has moved rightwardly from its rest position through a distance substantially equal to the clearance C, corresponding to a determined pressure in the chambers 68 and 72, the surfaces 94 and 120 engage one another to interrupt communication between the inlet 24 and outlet 30, and to define a second position for the piston member 50. Thereafter, liquid pressure in the chamber 72 increasing above the determined value acts on the effective area defined by the small diameter piston portion 54 while liquid pressure at the outlet 30 acts on the large diameter piston portion 52. Because of the differing areas of the piston portions 52 and 54, the piston member dithers in response to the increasing liquid pressure in the chamber 72 between a first position in which the valving surfaces 94 and 120 are disengaged to allow the flow of pressurized fluid toward the outlet 30 and the second position wherein fluid communication is interrupted.

Figure 5:
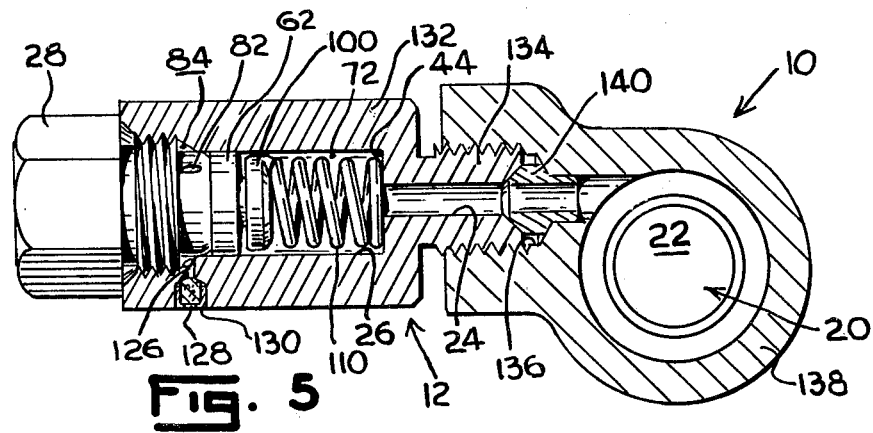
FIG. 5 is a fragmentary cross-sectional view of another alternative embodiment of the invention.

FIGS. 4 and 5 illustrate alternative embodiments of the invention which primarily differ from the embodiment illustrated by FIGS. 1-3 in the configuration of the housing 12. Features which are analogous in structure or function to those features referenced in FIGS. 1-3 are referenced by the same numeral throughout this application. In the embodiment illustrated by FIG. 4, the housing 12 does not provide a liquid reservoir adjacent the pressure proportioning valve. Consequently, a vent passage 126 opens from the chamber 86 directly to the atmosphere. A filter member 128 is received in the vent passage 126 to provide environmental protection for the proportioning valve. A cup-shaped retainer 130 is press-fitted into the passage 126 to retain the filter member 128 therein.

In the embodiment illustrated by FIG. 5, the housing 12 is not a part of the master cylinder 10. Instead, the housing 12 comprises a cylindrical body 132 having a threaded extension 134. The threaded extension 134 is threadably received by the outlet port 136 of a conventional master cylinder 138 and sealingly engages a tube seat 140 in much the same way as would a conventional brake line. The body 132 defines a vent passage 126 which is provided with a filter member 128 and retainer 130.

Figure 6:
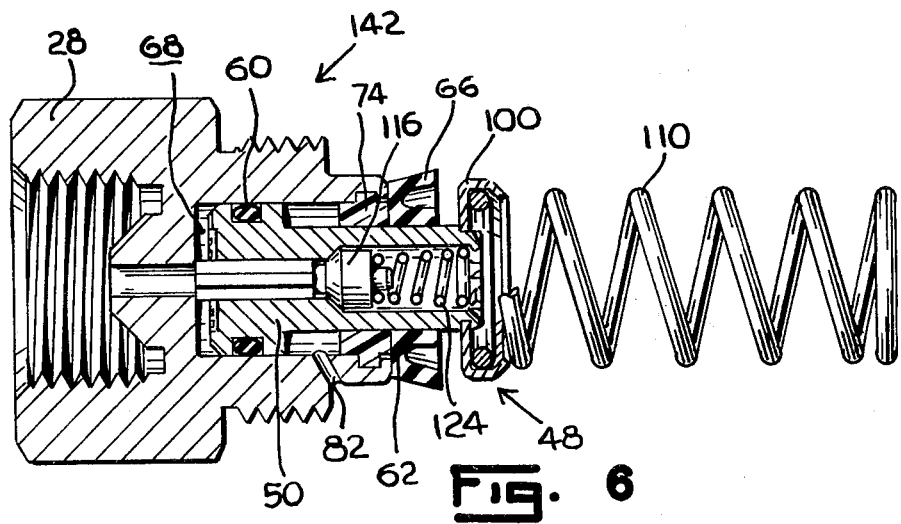
FIG. 6 is an isolated cross-sectional view of an apparatus embodying the invention and preparatory to its insertion into a housing.

FIG. 6 illustrates that the plug member 28, piston member 50, bearing member 74, sealing members 60 and 62, spring seat 100, spring 110, valve member 116, and spring 124, comprise a unitary subassembly 142. An examination of FIG. 6 will show that the subassembly 142 includes virtually all of the component parts of the proportioning valve which, by their dimensions, have a significant effect upon the location of the cusp on the graph of output pressure versus input pressure. The subassembly 142 lacks only a housing to comprise a complete proportioning valve. The significant dimensions of a housing, with respect to the subassembly 142, are the diameter and depth of the bore 26. Because the radially outer lip 66 of the lip seal 62 is capable of sealingly cooperating with bores having a relatively wide range of diameters, the diameter of the bore 26 is easily maintained within the acceptable range without the need for precise manufacturing methods. The depth of the bore 26 has an influence upon the preload of the spring 110 so that variations in the bore depth do cause variations in the cusp location. However, as was explained supra, the error factors which are introduced by variations in bore depth are very small. Consequently, the subassembly 142 effectively removes from the housing 12 any dimensions which have a significant impact upon the operation of the proportioning valve. Because of the relaxation of dimensional tolerances on the housing 12 which is made possible by this invention, the scrapping of housing because of minor manufacturing errors is virtually eliminated. Additionally, friction forces on the piston member 50, which may effect variations in the cusp location on successive operations of the proportioning valve, are reduced in comparison to prior proportioning valves because the lip seal 62 is a relatively low-friction type of sealing member.

We claim:

1. A fluid pressure proportioning valve comprising a housing defining a bore therein, first passage means for communicating pressurized fluid from a source thereof into said bore, second passage means for communicating pressurized fluid from said bore to a fluid pressure responsive device, a differential-area piston member movably received in said bore and dividing the latter into a pair of chambers, one of said chambers communicating with said second passage means, third passage means for interconnecting said pair of chambers, valve means for opening and closing said third passage means to respectively establish and interrupt fluid communication between said fluid source and said device in response to movement of said piston member, resilient means for biasing said piston member toward a first position wherein said valve means opens said third passage means, said piston member moving axially to a second position in response to a prescribed fluid pressure level in said pair of chambers to close said third passage means via said valve means, said piston member shuttling axially between said first and second positions in response to fluid pressure in said one chamber increasing above said prescribed pressure level to proportion pressurized fluid to said device via said other chamber, characterized in that said housing includes a plug member defining a portion of said bore, said bore portion receiving a portion of said piston member, said plug member further defining an abutment surface forming a manufacturing reference for measuring dimensions of said piston member and said valve means, said piston member engaging said abutment surface to define a rest position for said piston member, said piston member further including an axially extending bore receiving said valve means and defining said third passage means, said valve means including an operating stem extending axially in said axially extending bore and engageable with said abutment surface to define a rest position for said valve means whereby said abutment surface cooperates with both said valve means and said piston member to open said valve means when said piston member and said operating stem are in said rest position engaging said abutment surface, said valve includes an annular bearing member received in said bore portion and secured to said plug member, said bearing member slidably receiving a small diameter part of said piston member and defining an abutment surface confronting a shoulder formed by a large diameter part on said piston member, said shoulder engaging said abutment surface of said bearing member to prevent removal of said piston member from said bore portion.

2. The invention of claim 1 wherein said small diameter piston part includes a reduced diameter portion extending axially therefrom, said reduced diameter piston portion cooperating with said small diameter part to define a graduation, an annular spring seat received on said reduced diameter portion and engaging said graduation, said spring seat opposing said resilient means, and said reduced diameter portion further opposing a second resilient means engaging said valve means.

3. A fluid pressure proportioning valve comprising:
   a housing defining a first blind cylinder bore opening at one end and a first end wall closing the opposite end of said first bore, said housing defining an inlet communicating pressurized fluid from a source thereof into said first bore;
   a plug member secured to said housing and closing the open end of said first bore, said plug member defining a second blind cylinder bore concentric with and opening to said first bore, said plug member including a second end wall closing said second bore and confronting said first end wall, said plug member defining an outlet communicating pressurized fluid from said second bore to a fluid pressure responsive device;
   an annular bearing member received in said second bore and secured to said plug member adjacent the opening of said second bore, said bearing member defining a cylinder through bore substantially concentric with said first and second bores, said bearing member further including a pair of oppositely disposed annular abutment surfaces respectively confronting said first and said second end walls;
   a stepped piston member having a large diameter part movably received within said second bore and sealingly cooperating with said plug member to bound a first pressure chamber therein, said first pressure chamber communicating with said outlet, said large diameter piston part defining an abutment surface confronting and engageable with said second end wall of said plug member to define a first position for said piston member, said piston member further including a small diameter part extending axially from said large diameter part and cooperating therewith to define a step on said piston member, said step confronting and being engageable with one of said abutment surfaces of said bearing member to trap said piston member within said plug member, said small diameter piston part movably extending through said through bore of said bearing member and protruding into said first bore of said housing, said large and said small diameter piston parts cooperating with said bearing member and with said plug member to bound an annular chamber;

passage means for communicating said annular chamber with a source of fluid at ambient pressure;

an annular lip seal carried upon the protruding portion of said small diameter piston part adjacent the other of said abutment surfaces of said bearing member, said lip seal including a pair of like-disposed radially spaced lips extending toward said first end wall, the radially outer of said lips sealingly engaging said housing, the radially inner of said lips sealingly engaging said small diameter piston part, said lip seal cooperating with said small diameter piston part and with said housing to bound a second pressure chamber within the latter, said second pressure chamber communicating with said inlet;

an annular spring seat secured to said protruding portion of said small diameter piston part within said second chamber;

a first coil compression spring extending between said first end wall and said spring seat and secured to the latter, said first spring biasing said piston member toward said first position;

said stepped piston defining an axial through bore providing fluid communication between said first and said second pressure chambers, said through bore of said piston member providing a small diameter portion opening to said first chamber and a large diameter portion opening to said second chamber, said small and said large diameter bore portions cooperating to define a step therebetween defining a valve seat;

a valve member movably received in said through bore of said piston member, said valve member having a head portion defining a valve surface engageable with said valve seat to interrupt fluid communication between said first and said second chambers, said valve member further including a stem extending from said head portion through said small diameter portion of said piston member through bore and engaging said second end wall to unseat said valve member when said piston member is in said first position;

a second coil compression spring biasing said valve member into engagement at its stem with said second end wall;

said piston member being movable toward said first end wall in response to pressurized fluid in said first and second pressure chambers to a second position wherein said valve seat engages said valve surface.

* * * * *